(12) United States Patent
Moyer et al.

(10) Patent No.: US 8,972,671 B2
(45) Date of Patent: Mar. 3, 2015

(54) METHOD AND APPARATUS FOR CACHE TRANSACTIONS IN A DATA PROCESSING SYSTEM

(75) Inventors: William C. Moyer, Dripping Springs, TX (US); Michael D. Snyder, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1371 days.

(21) Appl. No.: 11/748,350

(22) Filed: May 14, 2007

(65) Prior Publication Data

US 2008/0288724 A1 Nov. 20, 2008

(51) Int. Cl.
G06F 12/02 (2006.01)
G06F 11/36 (2006.01)
G06F 12/08 (2006.01)

(52) U.S. Cl.
CPC ........ *G06F 12/0831* (2013.01); *G06F 11/3656* (2013.01)
USPC ............................. 711/154; 711/156; 717/124

(58) Field of Classification Search
CPC .................................... G06F 11/3648–11/3656
USPC .................................................. 711/146, 141
See application file for complete search history.

(56) References Cited

U.S. PATENT DOCUMENTS

| | | |
|---|---|---|
| 4,843,542 A | 6/1989 | Dashiell et al. |
| 5,420,999 A | 5/1995 | Mundy |
| 5,471,598 A | 11/1995 | Quattromani et al. |
| 5,561,779 A | 10/1996 | Jackson et al. |
| 5,561,786 A | 10/1996 | Morse |
| 5,636,363 A | 6/1997 | Bourekas et al. |
| 5,685,011 A | 11/1997 | Rosenthal et al. |
| 5,689,679 A | 11/1997 | Jouppi |
| 5,689,707 A | 11/1997 | Donnelly |
| 5,765,199 A | 6/1998 | Chang et al. |
| 5,819,304 A | 10/1998 | Nilsen et al. |
| 5,829,027 A | 10/1998 | Goodrum |
| 5,913,923 A | 6/1999 | Dunlap et al. |
| 5,990,914 A | 11/1999 | Horan et al. |
| 6,016,555 A | 1/2000 | Deao et al. |
| 6,044,478 A | 3/2000 | Green |
| 6,145,122 A | 11/2000 | Miller et al. |
| 6,260,131 B1 | 7/2001 | Kikuta et al. |

(Continued)

FOREIGN PATENT DOCUMENTS

EP 1629385 A4 8/2008
EP 2074510 A4 6/2012

OTHER PUBLICATIONS

International Search Report for coordinating PCT Application No. PCT/US2008/061887, mailed Sep. 29, 2008, of related U.S. Appl. No. 11/748,353.

(Continued)

*Primary Examiner* — April Y Blair
*Assistant Examiner* — Nicholas Simonetti
(74) *Attorney, Agent, or Firm* — Daniel D. Hill

(57) ABSTRACT

A plurality of new snoop transaction types are described. Some include address information in the requests, and others include cache entry information in the requests. Some responses include tag address information, and some do not. Some provide tag address content on the data bus lines during the data portion of the transaction. These new snoop transaction types are very helpful during debug of a data processing system.

16 Claims, 4 Drawing Sheets

(56) References Cited

U.S. PATENT DOCUMENTS

| | | | |
|---|---|---|---|
| 6,321,329 | B1 | 11/2001 | Jaggar et al. |
| 6,353,829 | B1 | 3/2002 | Koblenz et al. |
| 6,496,902 | B1 | 12/2002 | Faanes et al. |
| 6,532,553 | B1 | 3/2003 | Gwilt et al. |
| 6,560,688 | B1 | 5/2003 | Strongin et al. |
| 6,665,774 | B2 | 12/2003 | Faanes et al. |
| 6,684,296 | B2 | 1/2004 | Hayter et al. |
| 6,741,254 | B1 | 5/2004 | Jeddeloh |
| 6,934,937 | B1 | 8/2005 | Johnson et al. |
| 6,954,826 | B2 | 10/2005 | Moyer |
| 6,968,446 | B1 | 11/2005 | McGrath |
| 7,010,672 | B2 | 3/2006 | Ahmad et al. |
| 7,117,300 | B1* | 10/2006 | James et al. ............. 711/108 |
| 7,185,148 | B2 | 2/2007 | Moyer |
| 7,296,137 | B2 | 11/2007 | Moyer |
| 7,346,744 | B1 | 3/2008 | Glasco |
| 7,506,105 | B2 | 3/2009 | Al-Sukhni et al. |
| 7,555,605 | B2 | 6/2009 | Moyer |
| 2001/0032305 | A1* | 10/2001 | Barry ..................... 712/34 |
| 2002/0062427 | A1 | 5/2002 | Chauvel et al. |
| 2002/0152428 | A1 | 10/2002 | James et al. |
| 2002/0174316 | A1 | 11/2002 | Dale et al. |
| 2004/0193831 | A1 | 9/2004 | Moyer |
| 2004/0205420 | A1* | 10/2004 | Seeley et al. ............. 714/57 |
| 2004/0215857 | A1* | 10/2004 | Takeuchi et al. .......... 710/113 |
| 2005/0273562 | A1* | 12/2005 | Moyer ..................... 711/138 |
| 2006/0085489 | A1 | 4/2006 | Tomic et al. |
| 2006/0212426 | A1* | 9/2006 | Shakara et al. ............ 707/3 |
| 2006/0271919 | A1 | 11/2006 | Moyer |
| 2008/0010409 | A1* | 1/2008 | Rao et al. ................ 711/118 |

OTHER PUBLICATIONS

International Search Report for coordinating PCT Application No. PCT/US07/73833, mailed Sep. 18, 2008, of related U.S. Appl. No. 11/536,085.

Motorola; "MPC7400 RISC Microprocessor User's Manual"; Rev. 0, Mar. 2000, USA, pp. 3-1 thru 3-78, and 9-1 thru 9-24.

Office Action on related U.S. Appl. No. 11/748,353 mailed May 1, 2009.

Office Action on related U.S. Appl. No. 11/748,353 mailed Nov. 16, 2009.

Breen, Kristopher C. et al.: Aliasing and Anti-Aliasing in Branch History Table Prediction; ACM SIGARCH Computer Architecture News; pp. 1-4; vol. 31, No. 5; USA, Dec. 2003.

U.S. Appl. No. 11/140,176, Office Action—Non-Final Rejection, mailed May 3, 2007.

U.S. Appl. No. 11/140,176, Office Action—Allowance, mailed Aug. 9, 2007.

U.S. Appl. No. 11/536,085, Office Action—Non-Final Rejection, mailed Sep. 29, 2008.

U.S. Appl. No. 11/536,085, Office Action—Allowance, mailed Mar. 26, 2009.

U.S. Appl. No. 10/442,718, Office Action—Non-Final Rejection, mailed Nov. 3, 2004.

U.S. Appl. No. 10/442,718, Office Action—Allowance, mailed May 20, 2005.

U.S. Appl. No. 10/442,718, Office Action—Supplemental Allowance, mailed Jun. 28, 2005.

U.S. Appl. No. 11/197,830, Office Action—Allowance, mailed Nov. 7, 2006.

International Application PCT/US07/73833, PCT Search Report Written Opinion, mailed Sep. 18, 2008, pp. 1-3.

International Application PCT/US07/73833, PCT International Preliminary Report on Patentability, mailed Sep. 18, 2008, pp. 1-4.

International Application PCT/US04/13372, PCT Search Report Written Opinion, mailed Feb. 8, 2005, pp. 1-5.

International Application PCT/US04/13372, PCT International Preliminary Report on Patentability, mailed Feb. 8, 2005, pp. 1-6.

International Application PCT/US06/10742, PCT Search Report Written Opinion, mailed Sep. 27, 2007, pp. 1-4.

International Application PCT/US06/10742, PCT International Preliminary Report on Patentability, mailed Sep. 27, 2007, pp. 1-5.

* cited by examiner

| CACHE STATE DEFINITIONS ||
|---|---|
| NAME | DESCRIPTION |
| INVALID (INV) | THIS STATE INDICATE THAT THE CACHE LOCATION DOES NOT CONTAIN VALID DATA. |
| SHARED (S) | THE ADDRESSED LINE IS PRESENT IN THE CACHE, AND IT MAY BE ALSO PRESENT IN ANOTHER PROCESSOR'S CACHE. IT CAN NOT BE MODIFIED BY ANY PROCESSOR. |
| EXCLUSIVE UNMODIFIED (EU) | THE ADDRESSED LINE IS PRESENT IN THE CACHE, AND THIS CACHE HAS EXCLUSIVE OWNERSHIP OF THE LINE. IT IS NOT PRESENT IN ANY OTHER PROCESSOR'S CACHE. IT HAS NOT BEEN MODIFIED IN THIS PROCESSOR'S CACHE. THIS PROCESSOR MAY SUBSEQUENTLY MODIFY THIS LINE WITHOUT FIRST NOTIFYING OTHER BUS MASTERS. |
| EXCLUSIVE MODIFIED (EM) | THE LINE IS PRESENT IN THE CACHE, AND IT HAS BEEN MODIFIED WITH RESPECT TO MAIN MEMORY. THE LINE DOES NOT RESIDE IN ANY OTHER COHERENT CACHES. |

*FIG. 3*

METHOD AND APPARATUS FOR CACHE TRANSACTIONS IN A DATA PROCESSING SYSTEM

CROSS-REFERENCE TO RELATED APPLICATION(S)

This application is related to U.S. Pat. No. 7,296,137, issued Nov. 13, 2007, entitled "Translation Information Retrieval", first named inventor being William C. Moyer, and assigned to the current assignee hereof.

This application is related to U.S. Pat. No. 7,555,605, issued Jun. 30, 2009, entitled "Data Processing System Having Cache Memory Debugging Support and Method Therefor", first named inventor being William C. Moyer, and assigned to the current assignee hereof.

This application is related to U.S. Pat. No. 6,954,826, issued Oct. 11, 2005, entitled "READ ACCESS AND STORAGE CIRCUITRY READ ALLOCATION APPLICABLE TO A CACHE", first named inventor being William C. Moyer, and assigned to the current assignee hereof.

This application is related to U.S. Pat. No. 7,185,148, issued Feb. 27, 2007, entitled "READ ACCESS AND STORAGE CIRCUITRY READ ALLOCATION APPLICABLE TO A CACHE", first named inventor being William C. Moyer, and assigned to the current assignee hereof.

This application is related to U.S. patent application Ser. No. 11/748,353, filed on May 14, 2007, entitled "Method and Apparatus for Cache Transactions in a Data Processing System", first named inventor being William C. Moyer, and assigned to the current assignee hereof.

BACKGROUND

1. Field

This disclosure relates generally to a cache, and more specifically, to cache transactions in a data processing system.

2. Related Art

In current data processing systems formed on an integrated circuit, it is often difficult to allow real-time debuggers to be able to view the current value of one or more variables in memory that may be hidden from access due to a cache or a cache hierarchy. Currently, in real-time debugging, if a variable is cached, the debugger has no access to the latest value of the variable without a very intrusive set of operations to halt the processor and extract the value from the cache. The problem is even more acute if a cache hierarchy exists between the processor and the debugger. Also, current methods may affect the state of the cache, which is usually detrimental in a debugging context. For example, if the state of the cache is affected, then certain debug issues may not be exposed in the same manner as a result of differences in cache state.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in tabular form, a listing of cache state definitions in accordance with one embodiment of the present invention.

DETAILED DESCRIPTION

A plurality of new snoop bus commands or new snoop transaction types, and the supporting logic and framework for using them is described herein. In one embodiment, "show line" and "show doubleword" snoop transactions are provided to allow debug circuitry (e.g. 14 of FIG. 1) to gain access to the latest values of variables, even if they are cached, or to extract cache contents. In one embodiment, these snoop transactions act like existing snoop transaction types in some respects (e.g. in that snoop lookups are performed by participating bus masters). However, for the new snoop bus commands, the result of the lookup will cause a snoop response transaction to be requested on any hit, not just on a hit to a modified line. The response causes the contents of a cached doubleword or an entire cache line to be placed on a bus (e.g. 20 of FIG. 1), and thus available for capture by the debug circuitry (e.g. 14 of FIG. 1). In the illustrated embodiment, the new snoop transaction types include "show_line", "show doubleword", "show_target_line", and "show_target_doubleword". Alternate embodiments may have fewer, more, or different snoop transactions, may use different names for the snoop transactions, or may use modified versions of the snoop transactions.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
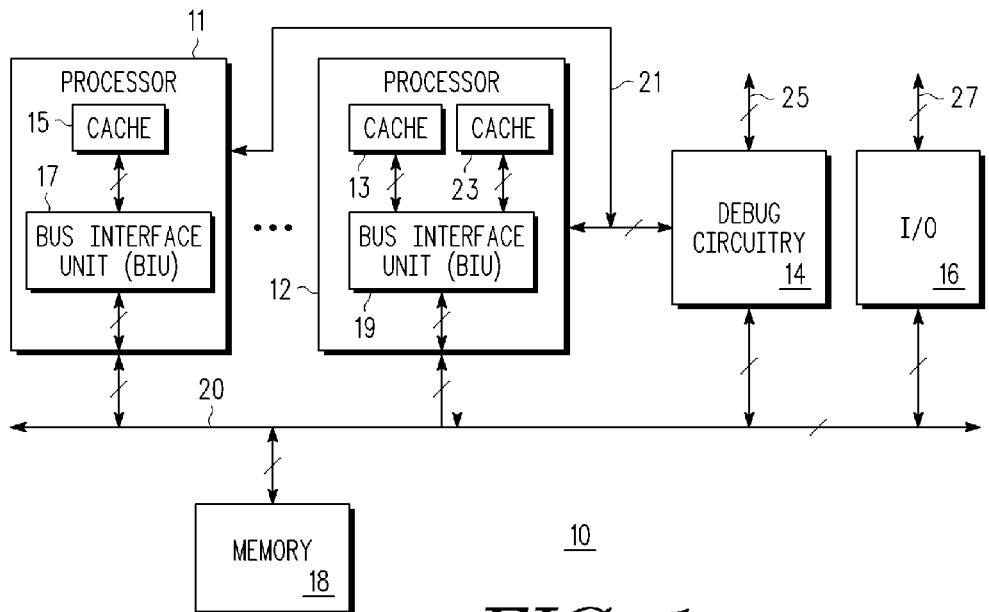
FIG. 1 illustrates, in block diagram form, a data processing system in accordance with one embodiment of the present invention.

FIG. 1 illustrates, in block diagram form, a data processing system 10 in accordance with one embodiment of the present invention. In one embodiment, data processing system 10 includes a processor 12, a debug circuit or debug circuitry 14, an input/output (I/O) circuit 16, and a memory 18, all bi-directionally coupled to a bus 20.

The memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit.

In one embodiment processor 11, processor 12 and debug circuitry 14 are bus masters. I/O circuitry 16 may also be a bus master in some embodiments. In one embodiment, processor 12 is a processor capable of executing instructions, such as a microprocessor, digital signal processor, etc., or may be any other type of bus master, such as for example, a direct memory access (DMA) controller, a bus bridge, or the like. Note that other slave devices may be included in data processing system 10 that are not illustrated in FIG. 1, such as for example, another memory or cache memory coupled to bus 20, as well as any type of peripheral circuit which resides on the system bus or is coupled to I/O circuit 16. In the illustrated embodiment, debug circuitry 14 is also bi-directionally coupled to processors 11 and 12 by way of conductors 21. In alternate embodiments, debug circuitry 14 may also be bi-directionally coupled to one or more of I/O circuitry 16 and memory 18 using one or more conductors (not shown) that are independent of bus 20.

In the illustrated embodiment, processor 11 includes a cache 15 which is bi-directionally coupled to bus 20 by way of bus interface unit (BIU) 17. Processor 12 includes a cache 13 and a cache 23 which are each bi-directionally coupled to bus 20 by way of bus interface unit (BIU) 19. In one embodiment, cache 13 functions as a level one (L1) cache for storing data and/or instructions for use by processor 12 and cache 23 functions as a level two (L2) cache for storing data and/or instructions for use by processor 12. Typically, data and/or instructions are loaded into caches 13, 23 from memory 18 before being executed by the processor. Caches 13, 23 may comprise a separate data cache and a separate instruction cache or may comprise a unified instruction and data cache, or may comprise only data caches. Caches 13, 23 comprise one or more data arrays, one or more tag arrays, and one or more status bit arrays. In some embodiments the tag and status information may be stored in a common array. Each cache entry consists of a block or line of data, a tag value which associates the data with a memory address, and status information. For some embodiments, the status information may include whether the cache entry is valid, whether the cache entry is "dirty" (i.e. modified with respect to the data associated with the same address in memory 18 or other external memory blocks if present), and whether the cache entry is exclusive or shared with other bus masters. Alternate embodiments may include less, more, or different cache status information. In an alternate embodiment, memory 18, or a portion of memory 18 may be characterized as a level two (L2) cache.

An input/output (I/O) module 16 is bi-directionally coupled to the bus 20 and to external circuitry (not shown). The I/O module 16 includes various interface circuits depending upon the type of external circuitry that is coupled to the I/O module 16. I/O module 16 may contain one or more alternate bus masters coupled to bus 20, and may contain one or more caches. In one embodiment, I/O module 16 may serve as a bus bridge, and be connected to one or more devices incorporating one or more caches via conductors 27.

Debug circuit 14 is bi-directionally coupled to one or more of bus processor 11, processor 12, I/O circuitry 16, and/or memory 18 via bus 20. Debug circuit 14 may also be bi-directionally coupled to external circuitry (not shown) such as a hardware tester or other debugging interface hardware. In one embodiment, debug circuitry 14 complies with the NEXUS debug protocol. For some embodiments, debug circuitry 14 also complies with the JTAG protocol. Alternate embodiments may use debug circuitry 14 that is complies with any desired debug protocol.

In general, debug circuitry 14 functions as a diagnostic check for data processing operations related to an access to caches 15, 13, 23, memory 18, and I/O module 16, and in other embodiments, other types of data retention circuits utilized by data processing system 10 whether internal to or external to data processing system 10. The processor 12 and alternate bus masters obtain mastership of the system bus 20 as needed and selectively access the system memory 18 to retrieve and store data and instructions. Debug circuitry 14 may be configured by the user of data processing system 10 to capture the values of one or more memory locations by monitoring addresses presented on bus 20, and capturing or sampling the related data values presented on bus 20. During bus read operations, the data values are provided by a selected slave device such as memory 18. During bus write operations, the data values are provided by a bus master of bus 20 such as processor 12. As the bus transfers occur, debug circuitry 14 monitors each transfer and selectively captures data values corresponding to data locations the user of debug circuitry 14 wishes to monitor. These values and conditions may be programmed into and transferred from debug circuitry 14 via one or more terminals 25 illustrated in FIG. 1. I/O circuitry 16 may also be coupled external to data processing system 10 by way of one or more terminals 27. In one embodiment, terminals 25 and 27 may be integrated circuit pins. In alternate embodiments, terminals 25 and 27 may be anything that can be used to transfer signals external to data processing system 10, such as, for example, conductive bumps, conductive pads, wires, etc.

Note that if a data variable or value is located within cache 13, the data value may be modified with respect to the corresponding value in memory 18, i.e. the latest (most up to date) value is not present in memory 18, but only within cache 13. If debug circuitry 14 accesses memory 18 to obtain the desired variable's value, it will not get a correct copy, since the copy may be modified internally in cache 13.

A new bus transaction type is provided in data processing system 10 to allow debug circuitry 14 to "see" a value which may be stored in a cache (e.g. cache 13). The bus transaction type is a "show" transaction. The bus transaction can be initiated by debug circuitry 14 acting as a bus master of bus 20. The bus transaction includes a desired address location to be accessed. It is determined (e.g. by cache control circuitry 54 of FIG. 2) if the address or cache entry results in a "hit" or a "miss" in the cache. When the address results in a hit, the value is provided to bus 20 associated with the address from the cache 13. Debug circuitry 14 then has access to the value from the bus 20 as it is provided by the processor (e.g. 12). In one embodiment, debug circuitry 14 monitors transactions on bus 20, and is capable of sampling the address and associated data values as bus transfers occur. Desired values can then be transferred after sampling to a user of the system 10 performing a debugging operation by means of signals from debug circuitry 14 of FIG. 1 (e.g. via terminals 25). Note that in one embodiment, a state of cache 13 is not modified when the value is placed on the bus 20. In most prior art systems, it is not possible to place the value of the data variable on bus 20 from cache 13 when a normal cache hit occurs, since the cache 13 satisfies the prior art load or store request generated by a normal load or store instruction. This causes an issue for debug circuitry 14, since the value is not made visible on bus 20 for capture. When the access address results in a miss, there is no information to be provided from the cache (e.g. 13) to debug circuitry 14. On a miss, data may be retrieved via bus 20, and thus be visible to debug circuitry 14 for capture. In these prior art systems, providing visibility only on cache misses results in limitations on the debugging operations that can be performed.

Typically, some data values are subject to change and are updated in response to executing instructions. In some debugging situations it may be desirable to retrieve the latest version of the value even when resident in the cache. A "dirty bit" "D" is associated with a cache entry indicates whether or not data in the cache associated with the effective address is different (i.e. has been modified) from data stored at another memory location, such as memory 18, corresponding to the data address. In accordance with the disclosed embodiment, a "dirty bit" associated with the address of the value is not modified when the value is retrieved from the cache and presented to the system bus 20 in response to executing a "show" bus transaction. Likewise, cache 13 is not modified if the value associated with the effective address in cache 13 is the same as the value in another memory location, i.e. the data is clean. In other words, even when a dirty bit of the hit cache entry indicates that data stored in the entry is clean, the data stored in the entry is provided to bus 20 and the entry is not modified. When a dirty bit of the hit cache entry indicates that data stored in the entry is dirty, the data stored in the entry is still provided to bus 20, and the entry is not modified, and the dirty bit is not cleared. This is different than the normal operation of a "dirty bit" in a cache.

Figure 2:
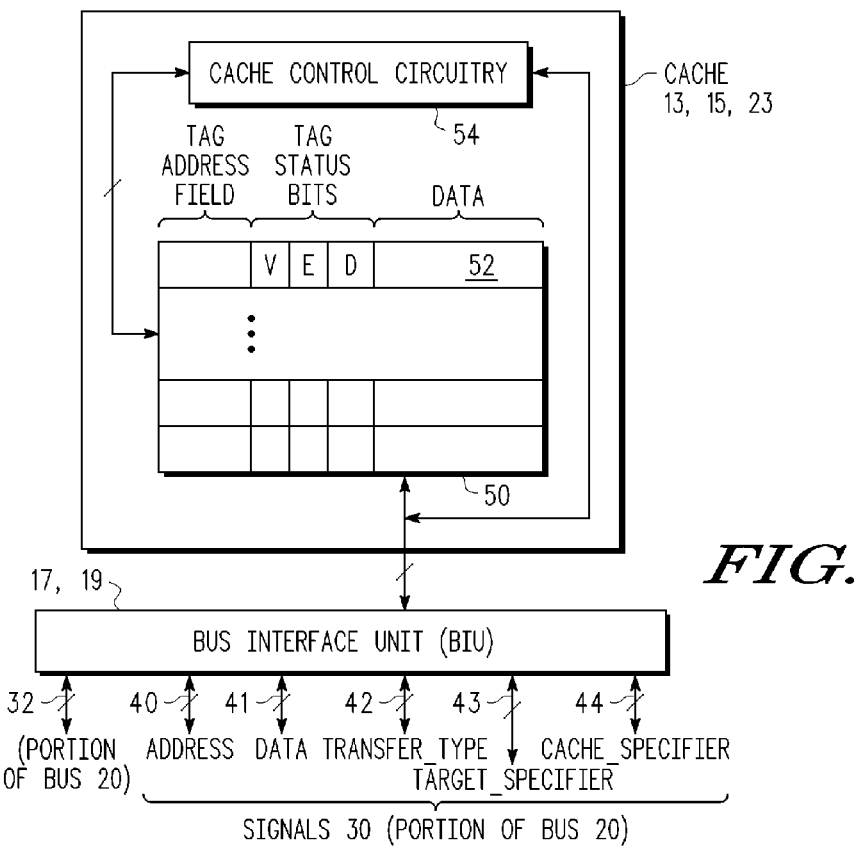
FIG. 2 illustrates, in block diagram form, a portion of processor 11 and/or processor 12 of FIG. 1 in accordance with one embodiment of the present invention.

FIG. 2 illustrates, in block diagram form, a portion of processor 11 and/or processor 12 of FIG. 1. FIG. 2 illustrates one possible embodiment of cache 13 and BIU 19, and/or cache 23 and BIU 19, and/or cache 15 and BIU 17, all of FIG. 1, in more detail. For ease of discussion, it will be assumed herein below that cache 13 uses the embodiment illustrated in FIG. 2. However, in alternate embodiments, cache 15 and/or cache 23 may also use the cache embodiment illustrated in FIG. 2, and/or cache 13 may use a cache embodiment different than that illustrated in FIG. 2. Thus, alternate embodiments of system 10 may use different architectures, structures, and/or circuitry to implement the various caches (e.g. 13, 23, and 15). In the illustrated embodiment, cache 13 includes cache control circuitry 54 and cache array 50 which are bi-directionally coupled to each other. In one embodiment, cache array 50 is an array of random access memory cells organized as a plurality of entries. In one embodiment, cache array 50 comprises SRAM (static random access memory) memory cells. In other embodiments, other memory types are suitable. In one embodiment of cache 13, entry 52 is representative of the plurality of entries and includes a tag address bit field labeled "TAG ADDRESS FIELD", a tag status bit field labeled "TAG STATUS BITS" and a data bit field labeled "DATA". The tag status bit field includes a valid bit labeled "V", an exclusive/shared bit labeled "E", and a dirty bit labeled "D".

In one embodiment of cache 13, each entry may be referred to as a "cache line" for processor 12. Cache array 50 is bi-directionally coupled to bus 20 via BIU 19. In one embodiment, cache control circuitry 54 selectively determines if an effective address pointed to by an instruction received from, for example, cache 13, memory 18, or debug circuitry 14 is a hit or a miss in cache 13. Alternate embodiments may use a translation look-up buffer (TLB) (not shown) coupled to cache 13 for performing address translation from an effective address to a physical address. This translation may be done in a standard manner that is known in the art. Cache control circuitry 54 can determine if an effective address pointed to by an instruction results in a hit or miss by comparing the physical address for an access provided by the TLB to the stored value(s) contained in one or more tag entries in cache array 50. In some embodiments, a TLB is not used and the effective address is provided directly to cache 13 without translation. In such embodiments, stored tag values correspond directly to effective addresses without address translation to a physical address being required.

Still referring to FIG. 2, cache 13 is bi-directionally coupled to BIU 19. BIU 19 is bi-directionally coupled to bus 20. In the illustrated embodiment, bus 20 includes signals 30 and signals 32. In one embodiments, signals 30 include a plurality of address signals 40, a plurality of data signals 41, one or more transfer_type signals 42, one or more target_specifier signals 43, and one or more cache_specifier signals 44.

FIG. 3 illustrates, in tabular form, a listing of cache state definitions in accordance with one embodiment of the present invention. Alternate embodiments of the present invention may use fewer, more, or different cache states than those illustrated in FIG. 3. FIG. 3 illustrates a MESI (Modified Exclusive Shared and Invalid) cache protocol having four states, namely an invalid state (INV), a shared state (S), an exclusive unmodified state (EU), and an exclusive modified state (EM). Other embodiments may use different cache protocols and their associated cache state definitions. Thus, the present invention is not limited in any way to the specific states illustrated in FIG. 3.

Figure 4:
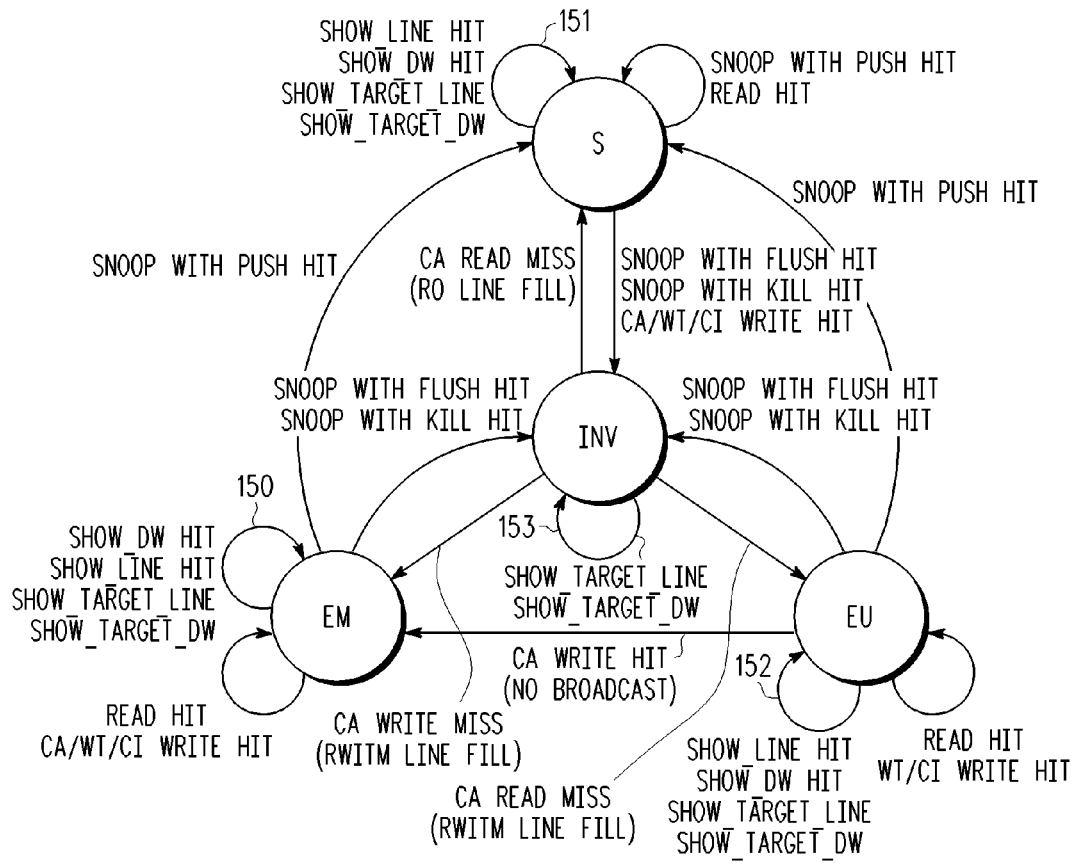
FIG. 4 illustrates, in state diagram form, a portion of a cache coherency state diagram in accordance with one embodiment of the present invention.

FIG. 4 illustrates, in state diagram form, a portion of a cache coherency state diagram in accordance with one embodiment of the present invention. The state diagram illustrated in FIG. 4 shows how a cache implementing the cache states of FIG. 3 can transition between the four cache states INV, S, EU, and EM. New state transitions have been incorporated into the prior art state diagram for a MESI cache coherency protocol to support the new snoop transaction types (show_line, show_dw, show_target_line, show_target_dw) for one embodiment of the present invention. For clarity purposes, note that some of the prior art bus transactions that are not relevant to the present invention have been omitted from FIG. 4 (e.g. bus commands that affect a whole block of cache, such as, for example, a bus command that flushes an entire cache block).

Still referring to FIG. 4, note that the "show line" (show_line hit) and "show doubleword" (show_dw hit) bus commands do not cause the cache 13 to change state. Similarly, note that the "show target line" (show_target_line) and "show target doubleword" (show_target_dw) bus commands do not cause the cache 13 to change state. These two new pairs of snoop transaction types or transfer type bus commands, and the supporting logic and framework for using them, allow debug circuitry 14 of FIG. 1 more visibility into the caches (e.g. 15, 13, and 23) used in system 10. The "show line" and "show doubleword" snoop transactions or bus commands are provided to allow debug circuitry 14 to gain access to the latest values of variables, even if they are cached, or to allow debug circuitry 14 to extract cache contents. In one embodiment, these snoop transactions may act like existing snoop transaction types in most respects, in that snoop lookups are performed by participating bus masters (e.g. 11, 12), but the result of the lookup will optionally cause a snoop response transaction to be requested on any hit, not just on a hit to a modified or dirty cache line. For the "show_target_line" and "show_target_dw" snoop commands, a specific cache target is identified as part of the transaction information, and for these specific command types, the result of the lookup will optionally cause a snoop response transaction to occur regardless of a hit or miss. Utilizing these snoop command types allows for visibility into the current state of a targeted cache without causing state changes of data, tag, or status information.

In response to the request portion of the "show line", "show doubleword", "show target line", and "show target doubleword" bus transactions, the cache control circuitry 54 (see FIG. 2) causes the contents of a cached doubleword or an entire line to be placed on bus 20, and thus available for capture by the debug circuitry 14. This exposure occurs regardless of the presence of backing store for the variables, i.e. there may be no physical memory associated with the address of the variable other than in a cache itself. By exposing the value of a variable in memory to the system bus 20, it can be captured by data trace logic in debug circuitry 14 and messaged out to the user via terminals 25. Note that the instructions are unobtrusive to the data cache, and no data cache state changes occur, regardless of the state of the variable (Modified, Exclusive, Shared, or Invalid). In the illustrated embodiment, options are provided to cause either an entire cache line to be placed on bus 20, or to limit the exposure to a data bus-width element (e.g. a doubleword) containing the desired variable. Alternate embodiments may instead use one snoop transaction type with a fixed width or size (e.g. line), or may use one bus command that has within it an encoding to select among a variable group of widths or sizes (e.g. line, doubleword, word, etc.)

Note that in one embodiment, snoop transaction types are provided that allow the value of a memory variable to be provided to debug circuitry 14 (see FIG. 1). In some embodiments, cache control circuitry 54 allows a cache line or a portion of a cache line to be broadcast on a bus 20 when it is present in the cache (e.g. 13), regardless of whether it is clean (i.e. unmodified) or dirty (i.e. modified). In one embodiment there is provided cache state logic (see FIG. 4) in cache control circuitry 54 (see FIG. 2) which does not modify the cache state (see FIG. 3) or replace cache lines to obtain the variable. In addition, for some embodiments, memory (e.g. 18) is not updated with the provision of the cache data to debug circuitry 14 in order to ensure that queries by debug circuitry 14 are minimally intrusive to the state of system 10.

In one embodiment, system 10 adds an additional bus transaction type "show" which allows debug circuitry 14 visibility into internal data cache state (e.g. of cache 13), which may be modified with respect to memory (e.g. 18). In one embodiment, when "show" is presented as a snoop read burst transaction, a normal snoop lookup is performed. If the transaction address hits in the data cache (e.g. cache 13), then a snoop copyback is performed, regardless of the modified or clean state of the cache line. The copyback is marked as a "show line" write, and in one embodiment is a burst of four doublewords to the bus. The state of the cache line in all processors (e.g. 11, 12) remains unchanged. The providing of the cache line to the bus 20 allows the debug circuitry 14 to see the content of the cache line, and thus to transfer these values out to an external debugger (not shown) via terminals 25. Note that in one embodiment, updates to memory (e.g. 18) should typically be blocked, if possible, during these "show" transfers to allow the state of the system 10 to remain minimally perturbed during debugging.

Additionally, in some embodiments, "doubleword" snoop bus commands are supported. When presented as a snoop single-beat read transaction, a normal snoop lookup is also performed. These "doubleword" bus commands operate similarly to the "line" bus commands, except that only a single doubleword of data in a hitting cache line is provided, via a single-beat write bus transaction which is marked as "doubleword".

The "show_target_line" and "show_target_doubleword" snoop bus commands are typically targeted to only a single master (e.g. processor 12) in the system 10, and thus only a single response will occur for each of these transactions. For the "show_line" and "show_doubleword" snoop transaction requests, these commands are simultaneously broadcast to multiple masters (e.g. processors 11 and 12), but only a single master needs to respond for the data to become visible to the debug circuitry 14. For cache lines in the exclusive state, this occurs naturally. For shared cache lines which are valid in multiple caches, only a single "show" bus transaction is required to provide visibility of the data, even though multiple cached copies exist. When the plurality of bus masters attempt to simultaneously "show" the cache line, only a single master will win arbitration for bus 20 and then respond with the requested information. A pending response in any other bus master can be killed or terminated when the arbitration winner performs the "show" response on bus 20, and the addresses of the pending response and the performed response match. The participating masters will monitor the bus to determine if another cache has provided the "show" information, and if so, will terminate their own requests to perform a "show" response for the indicated data. This may be done by monitoring the address and the transaction type information for transactions on bus 20, and determining that a "show" type response transaction is performed by another master. Alternatively, if multiple caches respond to a "show" command, all responses could be sent individually to the external debugger along with information on which cache responded, allowing the external debugger to see all copies of the line.

Figure 5:
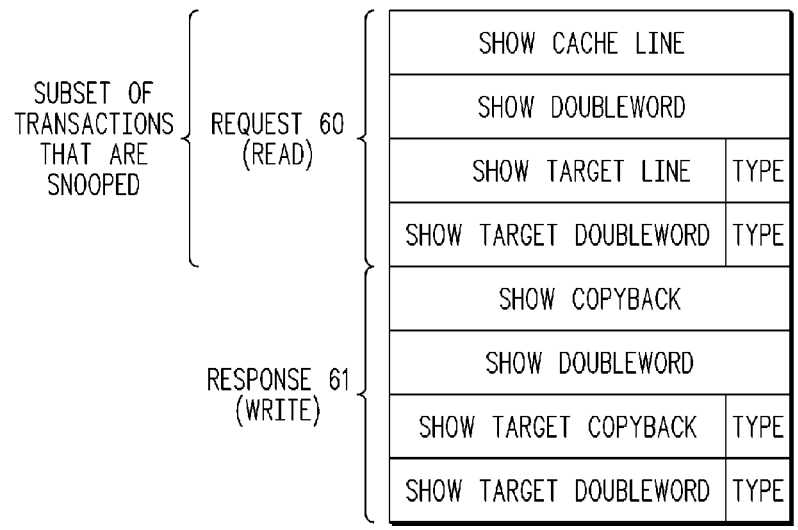
FIG. 5 illustrates, in tabular form, a plurality of snoop bus commands in accordance with one embodiment of the present invention.
Figure 6:
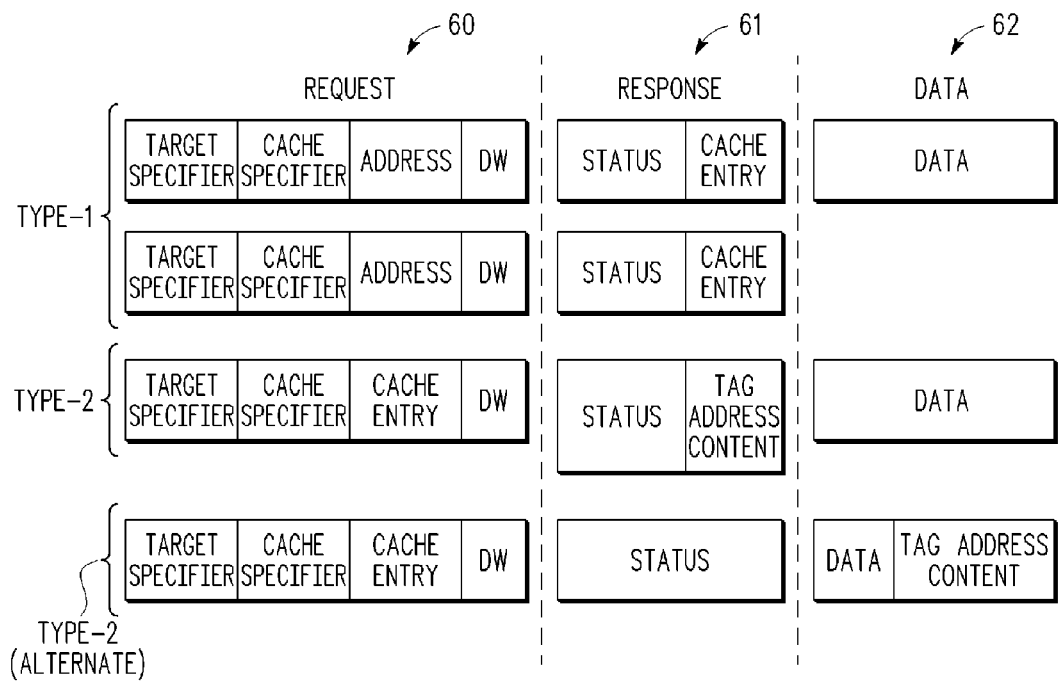
FIG. 6 illustrates, in tabular form, information provided on a bus during snoop bus commands in accordance with one embodiment of the present invention.

Referring to FIG. 4, in one embodiment, transitions 151-153 may be used to provide information from any cache (e.g. cache 13) to debug circuitry 14 (see FIG. 1). Referring now to FIGS. 2, 5 and 6, in one embodiment, the transfer-type signals 42 on bus 20 (see FIG. 2) are used to indicate when one of the bus snoop transactions listed in FIG. 5 are currently taking place on bus 20. Referring to FIGS. 5 and 6, note that each snoop bus transaction includes a request portion 60, a response portion 61, and a data portion 62 that all are provided on bus 20. In the request portion 60, a bus master (e.g. debug circuitry 14) initiates a read to a cache e.g. cache 13). In the response portion 61, the cache responds with a write operation. And in the data portion 62, the data stored in the cache that corresponds to the address or cache entry specified in the request 60 portion is provided on bus 20.

One embodiment of the bus snoop transactions listed in FIG. 5 will now be described. Note that alternate embodiments may have other additional snoop transactions that are not listed in FIG. 5.

One embodiment of the "show cache line" and "show doubleword" bus transactions of FIG. 5 will now be described. For the "show cache line" bus transaction, a bus master (e.g. debug circuitry 14) provides a snoop transaction request 60 which includes a desired address by way of signals 40 of bus 20 (see FIG. 2), and provides a transaction type indication by way of one or more signals 42. The transaction is monitored by one or more caches in the system which participate in normal snooping of bus transactions for coherency purposes. In response to a hit occurring on the lookup associated with the snoop transaction, a selected cache in the system performs a "show copyback" (for responding to a "show cache line" request) or a "show doubleword" (for responding to a "show doubleword" request) (see FIG. 5) write transaction of the cache line data information corresponding to the address of the request transaction regardless of the state of the dirty bit D, and the cache remains in its current state, i.e. the dirty bit is unchanged. In addition, all other caches remain in their respective current states. In one embodiment, memory 18 is not updated with the data provided on the response, even though a write transaction is indicated on the bus 20. In one embodiment, the response 61 includes status information from the cache and the cache entry that corresponds to the address in the request 60. If there was a cache hit, data is provided via data conductors 41 during the data portion 62. If there was a cache miss, data is not provided via data conductors 41 during the data portion 62. In an alternate embodiment, no status, or only partial status information may be provided during the response. In one embodiment, if the requested address misses in all of the caches participating in the transaction, data may be provided by memory 18 instead of no data being provided during data portion 62 of the transaction. In one embodiment, if multiple caches "hit", a single cache is selected to provide the response, and the remaining caches cancel any pending responses.

One embodiment of the "show target line" and "show target doubleword" bus transactions of FIG. 5 corresponding to the type-1 transactions illustrated in FIG. 6 will now be described. For these "show target" bus transactions, a bus master (e.g. debug circuitry 14) provides a request 60 which includes a target specifier by way of signals 43 of bus 20 (see FIG. 2), provides a cache specifier by way of signals 44, provides an address by way of signals 40, and provides a width indicator DW (e.g. doubleword, line, etc.) by way of one or more signals 32. The target specifier specifies which block or portion of circuitry in system 10 has a cache and is the "target" of this bus transaction. The cache specifier specifies which cache within the "target" is being accessed for this bus transaction. In response (see column 61 in FIG. 6), the specified cache in the target performs a "show target copyback" (see FIG. 5) of the cache line or a "show target doubleword" of the requested doubleword, regardless of the state of the dirty bit D, and the cache remains in its current state. Referring to FIG. 6, in the illustrated embodiment, the response 61 includes status information from the cache and the cache entry that corresponds to the address in the request 60. If there was a cache hit, data is provided via data conductors 41 during the data portion 62. If there was a cache miss, data is not provided via data conductors 41 during the data portion 62. In one embodiment, the response may only include status information, and cache entry information may not be provided. The status information may be indicated in a particular response type encoding signaled via one or more signals 32 of bus 20, or may be provided directly in an unencoded format.

One embodiment of the "show target line" and "show target doubleword" bus transactions of FIG. 5 corresponding to the type-2 transactions illustrated in FIG. 6 will now be described. For the type-2 "show cache line" bus transaction, what is different from type-1 is that instead of providing an address in the request portion 60, the bus master (e.g. debug circuitry 14) provides a cache entry specifier. The specifier is used to specify a particular storage location within the targeted cache. The response from the cache is different in that the response 61 does not include cache entry information, and may or may not include information or content from the tag address field of the cache entry (e.g. 52 in FIG. 2). For one embodiment of type-2 transactions, information or content from the tag address field of the cache entry (e.g. 52 in FIG. 2) may be provided on data conductors 41 of bus 20 (see FIG. 2) during the data portion 62 if it was not provided during the response portion 61. Alternate embodiments may use one or more of the type-1 transactions, may use one or more of the type-2 transactions, or may use different transactions. Note that the "show doubleword" bus transaction for request 60 (see FIG. 5) may function in the same manner as the "show cache line" bus translation for request 60, except the width is a doubleword instead of a cache line. Similarly, note that the "show doubleword" bus transaction for response 61 may function in the same manner as the "show copyback" bus transaction for response 61, except the width is a doubleword instead of a cache line. The transaction types for "show target line" and "show target doubleword" may be similarly differentiated.

Note that one or more caches in system 10 may be set associative or fully associative. If a cache (e.g. 13) is fully associative, the "cache entry" in FIG. 6 may be used to directly specify a desired entry in the cache. However, if the cache (e.g. 13) is set associative, the "cache entry" specifier may be replaced with "cache set" and "cache way" information for some embodiments.

Note that the terms transfer type, transaction type, bus transaction type, snoop transaction, snoop transaction type, snoop bus command, and bus command have been used interchangeably herein.

As can be seen from the description of the present invention, a cache coherency protocol may be extended to incorporate debug visibility transactions in an advantageous manner, allowing for improved cache visibility by a debugger.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 18 may be located on a same integrated circuit as masters 11 and 12 or on a separate integrated circuit or located within another peripheral or slave discretely separate from other elements of system 10. Debug circuitry 14 and I/O circuitry 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A method for a cache coupled via a bus to an external device, the method comprising:
   in response to receiving a request, providing a response to the external device via the bus containing at least a portion of a tag address corresponding to a cache entry in the cache.
2. The method of statement 1, wherein the request comprises the cache entry.
3. The method of statement 1, wherein the request containing the cache entry further comprises a target specifier and a cache specifier.
4. The method of statement 3, wherein the target specifier is used to select a target device from a plurality of target devices coupled to a device issuing the request and wherein the cache specifier is used to select a cache from within the selected target device.
5. The method of statement 1 further comprising receiving the request containing the cache entry from a debug circuitry.
6. The method of statement 1 further comprising receiving the request to provide at least one portion of the cache entry from at least one of a bus bridge, a direct memory access controller, and a processor.
7. The method of statement 1 further comprising providing data corresponding to the cache entry regardless of a state of the cache entry.
8. A method for a cache, the method comprising:
   in response to receiving a request comprising a target specifier, a cache specifier, and at least an address portion, providing at least a portion of a cache entry to a device external to the cache.
9. The method of statement 8, wherein the request is received from the device external to the cache, and wherein the target specifier is used to select a target device from a plurality of target devices coupled to the external device, and wherein the cache specifier is used to select a cache from within the selected target device.
10. The method of statement 8, wherein the device external to the cache is a debug device.
11. The method of statement 8, wherein the device external to the cache is at least one of a bus bridge, a direct memory access controller, and a processor.
12. The method of statement 8 further comprising providing data corresponding to the cache entry regardless of a state of the cache entry.
13. A method for a cache, the method comprising:
    in response to receiving a request comprising a target specifier, a cache specifier, and at least a portion of a cache entry specifier, providing at least a portion of a stored cache entry to a device external to the cache.
14. The method of statement 13, wherein the request is received from the device external to the cache, and wherein the target specifier is used to select a target device from a plurality of target devices coupled to the external device, and wherein the cache specifier is used to select a cache from within the selected target device.
15. The method of statement 13, wherein the device external to the cache is a debug device.
16. The method of statement 13, wherein the device external to the cache is at least one of a bus bridge, a direct memory access controller, and a processor.
17. The method of statement 13 further comprising providing data corresponding to the cache entry regardless of a state of the cache entry.

What is claimed is:
1. A method for a cache coupled via a bus to a debug circuit, the method comprising:
   the bus receiving a request from the debug circuit,
   wherein the request comprises a target specifier, a cache specifier and a cache entry,
   wherein the target specifier specifies a target circuit which comprises the cache and is a target of the request from the debug circuit, and
   wherein the cache specifier specifies which cache within the target circuit is being accessed for the request; and
   in response to the bus receiving the request from the debug circuit, providing a response to the debug circuit via the bus,
   wherein the response comprises at least a portion of a tag address content corresponding to a cache entry in the cache,
   wherein the at least the portion of the tag address content comprises tag information actually stored in the cache itself, and wherein even when a dirty bit associated with the cache entry indicates that data stored in the cache entry is dirty, the data stored in the cache entry is provided to the debug circuit via the bus and neither the cache entry is modified nor the dirty bit is cleared.
2. The method of claim 1, wherein providing the response to the debug circuit comprises:
   providing a first response portion; and
   providing a second response portion, wherein the first response portion and the second response portion are not a same portion, and wherein when a bus transaction type-2 is indicated by the bus, the tag address content is provided as part of the first response portion.

3. The method of claim 1, wherein receiving the request comprises receiving a snoop transaction from the bus.

4. The method of claim 1, wherein the debug circuit comprises at least one of a bus bridge, a direct memory access controller, and a processor.

5. The method of claim 1 further comprising providing data corresponding to the cache entry regardless of a state of the cache entry.

6. A method for a cache coupled via a bus to a device external to the cache, the method comprising:

in response to receiving a first request comprising a first target specifier, a first cache specifier, and at least an address portion, providing a first response to the device external to the cache, wherein the first target specifier specifies a target circuit which comprises the cache and is a target of the first request, wherein the first cache specifier specifies which cache within the target circuit is being accessed for the first request, and wherein the first response comprises a first valid bit and at least a portion of a first cache entry, and wherein even when a first dirty bit associated with the first cache entry indicates that data stored in the first cache entry is dirty, the data stored in the first cache entry is provided via the bus to the device external to the cache and neither the first cache entry is modified nor the first dirty bit is cleared; and in response to receiving a second request comprising a second target specifier, a second cache specifier, and at least a portion of a second cache entry, providing a second response to the device external to the cache, wherein the second target specifier specifies the target circuit which comprises the cache and is the target of the second request, wherein the second cache specifier specifies which cache within the target circuit is being accessed for the second request, wherein the second response comprises a second valid bit and at least a portion of a tag address content, and wherein even when a second dirty bit associated with the second cache entry indicates that data stored in the second cache entry is dirty, the data stored in the second cache entry is provided via the bus to the device external to the cache and neither the second cache entry is modified nor the second dirty bit is cleared, and wherein the at least the portion of the tag address content comprises tag information actually stored in the cache itself.

7. The method of claim 6, wherein the device external to the cache comprises debug circuitry for receiving the second valid bit and said at least the portion of the tag address content.

8. The method of claim 6, wherein the first request comprises a snoop transaction on a bus.

9. The method of claim 6, wherein the device external to the cache is at least one of a bus bridge, a direct memory access controller, and a processor.

10. The method of claim 6, wherein the first request further comprises a width indicator.

11. Circuitry, comprising:

a bus for transferring a request for debug information and for transferring the debug information;

a cache, coupled to the bus, the cache comprising a tag address field for storing tag address content, a tag status field for storing status information, and a data field for storing data information, wherein the tag status field comprises a dirty bit for marking a cache line as dirty, and wherein the cache provides the debug information from the cache line even when the cache line is dirty, debug circuitry, coupled to the cache via the bus, wherein the cache provides the debug information to the debug circuitry in response to receiving the request for debug information, and wherein the request for debug information comprises a target specifier and a cache specifier, wherein the target specifier specifies a target circuit which comprises the cache and is a target of the request for debug information, and wherein the cache specifier specifies which cache within the target circuit is being accessed for this request, and wherein the debug information provided by the cache to the debug circuitry comprises the tag address content.

12. Circuitry as in claim 11, wherein the cache provides the debug information to the debug circuitry during a snoop bus transaction on the bus.

13. Circuitry as in claim 11, wherein the cache provides the debug information to the debug circuitry regardless of whether the request for debug information produced a cache hit or a cache miss.

14. Circuitry as in claim 11, wherein the cache provides the debug information to the debug circuitry regardless of whether a cache line that hit was dirty or clean.

15. Circuitry as in claim 11, wherein the bus comprises transfer-type signals for indicating one of a plurality of bus snoop transactions when the debug information is being transferred on the bus.

16. Circuitry as in claim 11, wherein the request for debug information is provided to the bus from at least one of the debug circuitry, a bus bridge, a direct memory access controller, and a processor.

* * * * *